United States Patent [19]

Uhlig

[11] 4,079,111
[45] Mar. 14, 1978

[54] METHOD OF FORMING THERMOPLASTIC CONTAINERS

[75] Inventor: Albert R. Uhlig, Toledo, Ohio

[73] Assignee: Owens-Illinois, Inc., Toledo, Ohio

[21] Appl. No.: 653,696

[22] Filed: Jan. 30, 1976

Related U.S. Application Data

[63] Continuation of Ser. No. 495,636, Aug. 8, 1974, abandoned.

[51] Int. Cl.² .............................................. B29C 17/07
[52] U.S. Cl. ........................................ 264/89; 264/90; 264/93; 264/98; 264/296; 264/327; 264/DIG. 41; 425/525; 425/530
[58] Field of Search ...................... 264/89, 90, 92, 94, 264/96–99, 296, 327, DIG. 41, 93; 425/387 B, 326 B, DIG. 215, DIG. 214; 222/107; 215/1 C

[56] References Cited

U.S. PATENT DOCUMENTS

| | | | |
|---|---|---|---|
| 3,271,490 | 9/1966 | Cattaneo | 264/296 X |
| 3,494,509 | 2/1970 | McGuire | 222/107 |
| 3,714,311 | 1/1973 | Stefanka | 264/294 X |
| 3,764,644 | 10/1973 | Robinson | 264/296 X |
| 3,819,789 | 6/1974 | Parker | 264/296 X |
| 3,826,409 | 7/1974 | Chilcoate | 222/107 |
| 3,860,683 | 1/1975 | Ward | 264/98 X |

FOREIGN PATENT DOCUMENTS 1,001,672  8/1965  United Kingdom ................... 264/98

Primary Examiner—Jan H. Silbaugh
Attorney, Agent, or Firm—Richard D. Heberling

[57] ABSTRACT

Method of forming a container in a collapsed or folded configuration from a thermoplastic material. A preform is made from an extruded tube of thermoplastic material in a preform mold. The preform is then transferred to a deformation mold. The preform has a skin of relatively cool material on its exterior and interior surfaces; however, the interior of the walls between the skins is still in a deformable state. In the deformation mold, the preform is collapsed or folded and held in such condition until the interior material in the walls has become set. This leaves the container so formed with a memory in the folded state. When filled, the container may be elongated beyond the folded state dimensions, but will try to return to that state as the contents are dispensed as a result of the formed-in memory.

4 Claims, 14 Drawing Figures

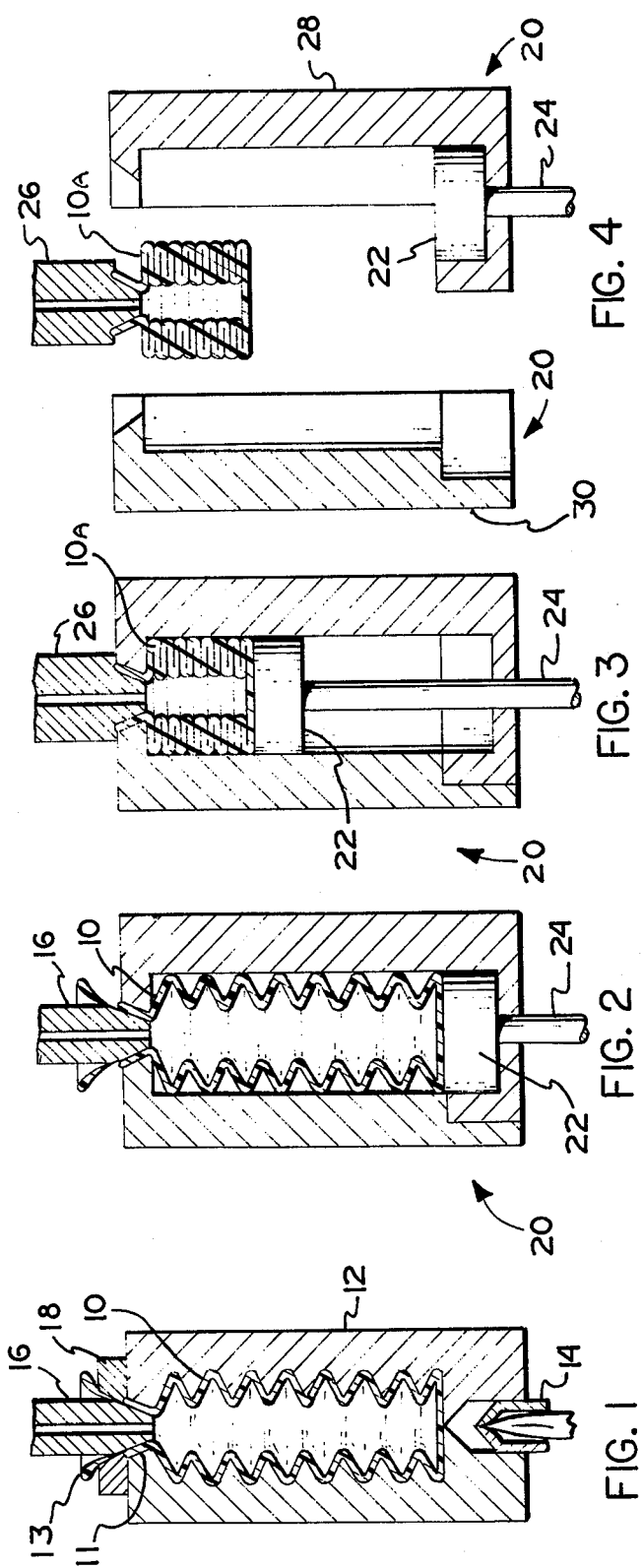

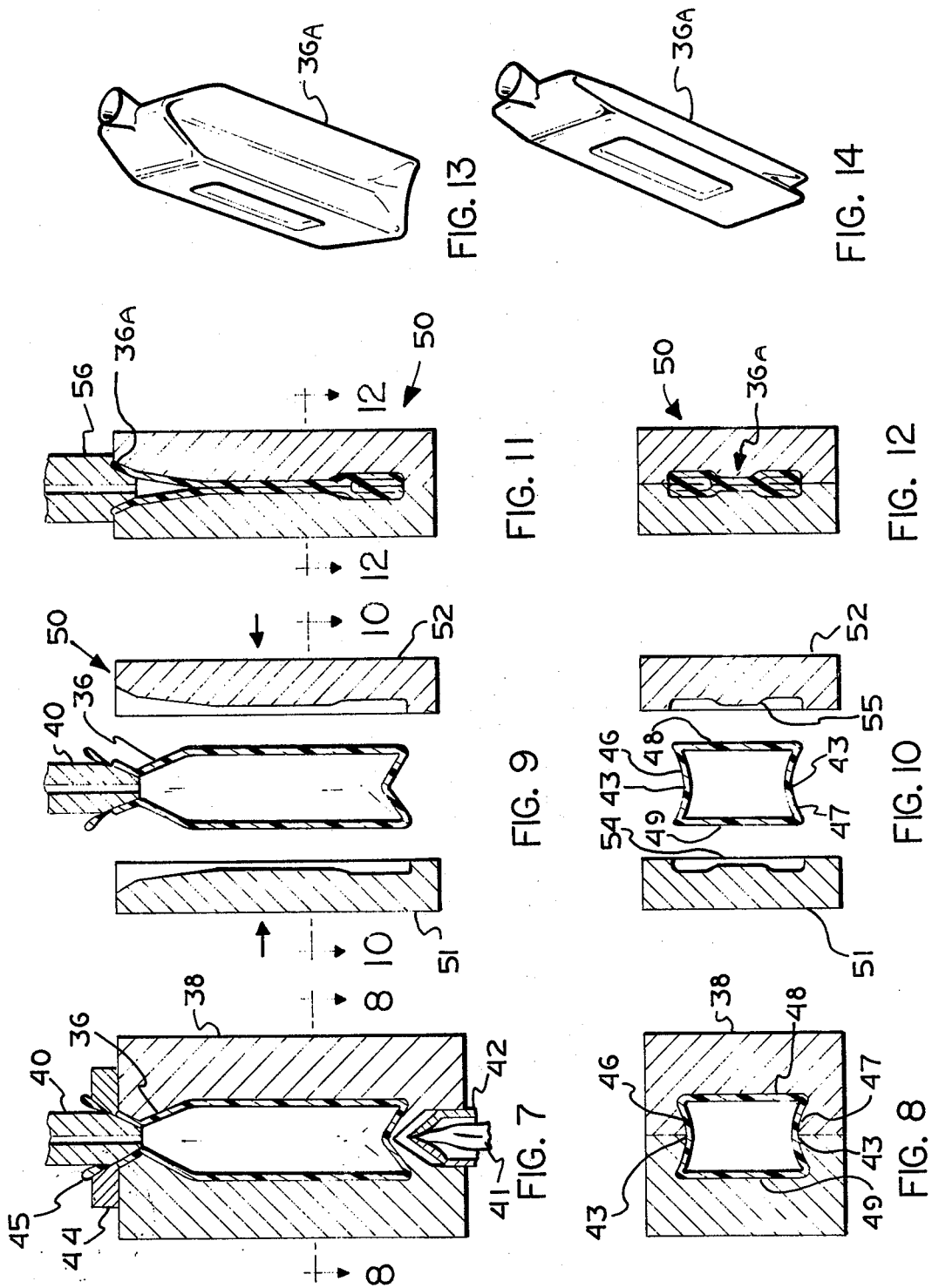

METHOD OF FORMING THERMOPLASTIC CONTAINERS

This is a continuation of application Ser. No. 495,636, filed Aug. 8, 1974, now abandoned.

BACKGROUND OF THE INVENTION

This invention generally relates to the formation of containers of thermoplastic material from an extruded tube of thermoplastic material. More particularly, this invention relates to formation of such containers utilizing a preliminary or preform shape which is made directly from the extruded tube of material. Specifically, this invention relates to a method of making a thermoplastic container having a memory in a collapsed or folded state by deformation of a preform shape while the interior of the walls of the preform shape are still in a deformable state.

The manufacture of blown thermoplastic containers using an intermediate preform shape is known in the art and is illustrated in U.S. Pat. Nos. 3,767,747 and 3,781,395. In addition, thermoplastic containers designed to facilitate the dispensing of their contents are also known. Examples of such containers may be seen in U.S. Pat. Nos. 3,301,293, 3,319,540 and 3,819,789. However, one flaw in these prior art containers is that during forming their material received a memory of their final shape. Thus, when dispensing the contents of these containers, the container returns to its original as formed shape whenever external pressure applied to dispense the contents is released. This is undesirable because it makes complete dispensing of the contents of such containers somewhat difficult. Good examples of this situation are thermoplastic tubes for shampoo or toothpaste. These tubes always try to return to their original, tubular shape after being squeezed. U.S. Pat. No. 3,301,293 shows one example of a structure to overcome this problem. However, the solution is purely mechanical and the locking features of the container adds undesirable complexity to the molding or forming process. I have found that these deficiencies in the prior art can be overcome by molding in a memory of the collapsed state in a thermoplastic container. As the contents of such a container are dispensed, the memory tends to urge the container toward a collapsed state, thereby leading to more efficient and easier dispensing of the entire volume of product in such a container.

SUMMARY OF THE INVENTION

My invention resides in an improved thermoplastic container which retains a memory of a partially collapsed state and normally tends to assume this partially collapsed state. In the method of making the container, a preform of the container is blown from the thermoplastic material. The preform is then transferred to a deformation mold. In the deformation mold, the preform is partially collapsed while the interior of the thermoplastic walls of the preform is still in a deformable state to thereby define a container having memory in the collapsed state.

BRIEF DESCRIPTION OF THE DRAWINGS

FIG. 1 is a side elevational view, in cross section, of a preform and preform mold;

FIG. 2 is a side elevational view, in cross section, of the preform of FIG. 1 after transfer to a deformation mold;

FIG. 3 is a view similar to FIG. 2 after deformation of the preform has occurred;

FIG. 4 is a side elevational view, in cross section, of the deformation mold of FIGS. 2 and 3 in an opened position to allow removal of the completed container;

FIG. 5 is a side elevational view, in cross section, of the container of FIG. 4 filled with product and capped;

FIG. 6 is the container shown in FIG. 5 with the contents thereof partially dispensed;

FIG. 7 is a side elevational view, in cross section, showing a modified preform and preform mold;

FIG. 8 is a top cross sectional view taken along the line 8—8 of FIG. 7;

FIG. 9 is a side elevational view, in cross section, of the transfer of the preform of FIG. 7 to a modified, open, deformation mold;

FIG. 10 is a top cross sectional view taken along the line 10—10 of FIG. 9;

FIG. 11 is a side elevational view, in cross section, of the deformation mold of FIG. 9 closed about the preform of FIGS. 7 and 9 to deform the preform;

FIG. 12 is a top cross sectional view taken along the line 12—12 of FIG. 11;

FIG. 13 is a perspective view of the container formed in FIG. 11 filled with a product; and FIG. 14 is a perspective view of the container formed in FIG. 11 in its normal state.

DETAILED DESCRIPTION OF THE DRAWINGS

Reference is made to U.S. Pat. No. 3,767,747, the teachings of which are hereby incorporated by reference, for disclosure of an apparatus for carrying out the method of the present invention. The subject patent basically discloses a thermoplastic blow molding machine in which a freely pendant tube of the thermoplastic material is extruded from an annular orifice. This tube is enclosed in a preform blow mold which is positioned at the orifice and has an interior cavity that defines the general configuration of the preform. The enclosed tube is then separated from the orifice and shifted away from the orifice. A first blow tube is inserted into the mold-enclosed tube and the tube is then blown into the shape of the preform mold cavity. The preform mold is then opened while the blown preform shape is supported by the first blow tube. The preform shape is then enclosed within a final blow mold. The first blow tube is removed and, after transfer to a final blowing station, a second blow tube is inserted which then blows the preform into the ultimately desired shape as defined by the final blow mold. The final blow mold then opens and allows removal of the completed thermoplastic article.

FIG. 1 illustrates the initial stage of operation of this process. In FIG. 1, a preform 10 is blown from a tube of thermoplastic material into conforming relationship with the interior cavity of a preform mold 12. The preform mold 12 may include, as is well known in the art, a tail-removing mechanism 14 for removing flash or waste material from the lower portion of the preform 10. Also shown in FIG. 1, is a first blow tube 16 through which pressurized fluid is introduced to blow the tube of thermoplastic material into conforming relationship with the interior cavity of the preform mold 12. The upper portion 11 of the preform 10 is compression molded around the first blow tube 16. A cutting sleeve 18 also operates at this time in the process and removes excess material 13 from around the upper portion of the preform 10. After completion of the blowing of the preform shape 10, the preform mold 12 opens and the preform 10 is transferred to a deformation mold 20. It is this step which is different from the steps taught in U.S. Pat. No. 3,767,747. The deformation mold 20 rather than defining a precise shape for the final article is used to deform the preform 10 into a desired configuration. The illustration of the preform 10 in FIG. 2 is that of a pleated type of structure. It is important to realize that the teachings and understandings embodied in the cited U.S. patent are utilized in allowing deformation of the preform 10 at this point. It must be understood that while the outer surface of the preform 10 has formed a skin, both interiorly and exteriorly, the inner portions of the walls of the preform 10 are still at such a temperature that they are readily deformable and may be deformed to impart a new history or memory to the material which is still in such a state. If a thermoplastic material is deformed while still in this state, the material will retain this shape when it has been completely cooled. It is this property of the material which is utilized in the present process. Insomuch as the interior and exterior surfaces have cooled sufficiently to form a skin, they may be folded into contact without sticking. In this particular example, the deformation mold 20 includes a bottom plate member 22 which seals off the lower portion of the deformation mold 20 and upon which the preform shape 10 generally rests. The bottom plate 22 is carried by a ram member 24 which is movable. The ram member 24 may be movable by a reciprocating fluid motor or be a mechanically moved member. The precise method of moving the ram member 24 may be dictated by the configuration of the machine using this process. However, its purpose is quite clear to those skilled in the art and the powering of the ram member 24 should be a matter of mere mechanical expediency.

While not explicitly illustrated, between the configuration shown in FIG. 2 and the configuration shown in FIG. 3, the first blow tube 16 may be withdrawn and a second blow tube 26 may be inserted into the preform 10. The entire process may be carried out using a single blow tube, but this would lead to some loss of efficiency. The use of two blow tubes allows an overlapping cycle to be followed. The ram member 24 is actuated, by whatever means chosen, thus moving the bottom plate 22 upward toward the second blow tube 26. When the desired degree of collapse of the preform 10 has been reached, the motion of the ram member 24 is ceased, thus holding the bottom plate 22 at a fixed location. During this time, if desired, a small amount of cooling and blowing media may be introduced through the second blow tube 26. However, this would not always be necessary and its utilization is a matter of skill and is dependent to a certain extent upon the precise type of thermoplastic material being utilized to form the desired final container. It would also be possible, although not explicitly illustrated, to connect the second blow tube 26 to a vacuum pump. In this event, the bottom plate 22 would not have to be movable. Rather, the deformation mold 20 would be positively vented to the atmosphere. With the second blow tube 26 connected to a vacuum pump, a lower pressure region would be created within the preform 10. Atmospheric pressure would thus cause the collapse or folding of the preform 10 and should reach precisely the same configuration as shown in FIG. 3. This process would be somewhat simpler in terms of the mechanism involved since it would not be necessary to employ a movable bottom plate 22. It would also be possible to introduce high pressure fluid through a fixed bottom plate to force the preform 10 upwardly. In this case, a vent for the fluid so used would have to be provided in the deformation mold 20.

FIG. 4 illustrates the now collapsed or folded container 10A supported from the second blow tube 26 with the deformation mold 20 opened into its two component elements. The deformation mold 20 is a common split mold and has two separate sections 28 and 30. Also note in FIG. 4 that the bottom plate 22 has been retracted to its lowermost position in anticipation of the beginning of another cycle. With the now collapsed or folded container 10A suspended from the second blow tube 26, the container 10A may be removed from the second blow tube 26 as a finished product.

It is again important to remember that because of the thermal history involved, the container 10A will attempt to assume the configuration illustrated in FIG. 4 whenever possible. The elongated shape illustrated in FIGS. 1 and 2 is now an unnatural shape and the elastic memory induced into the container 10A by folding the preform 10 while the interior portion is at a temperature at which the plastic material may be readily deformed and set, will attempt to force it into its collapsed configuration. FIGS. 5 and 6 illustrate this graphically. In FIG. 5, the folded container 10A has been filled with a fluid material 32 and covered with a closure member 34. The fluid material 32 exerts a hydrostatic pressure upon the container 10A and forces it to expand into an elongated shape similar to that originally assumed by the preform 10 in the preform mold 12. In this state, whenever any of the fluid 32 is utilized or displaced from the container 10A, the memory within the container 10A tries to collapse the container 10A toward its folded configuration. This is illustrated in FIG. 6 wherein a part of the fluid 32 illustrated in FIG. 5 as filling the container 10A has been dispensed thus causing the container 10A to collapse slightly. This characteristic is of great importance since it allows a complete dispensing of the contents held within the container 10A. As a container, this is highly desirable, since most thermoplastic containers have the tendency to retain their normal fully blown shape. A good example of this, as previously noted, are tubes which contain material such as toothpaste or shampoo. These tubes inherently seek to retain the round or tube-like configuration into which they were formed during their initial forming cycle. However, if such a material were placed into the collapsed container 10A, as the material was dispensed, the container 10A would fold upon itself in attempting to return to the folded configuration it was forced into during its forming cycle. It is possible to make the elastic memory of the container 10A so strong that it must be pressure filled and then capped with a one-way valve, for example, an aerosol spray valve. In this case, the container 10A can be used to dispense materials much as conventional aerosol spray cans do without the need of filling with a potentially dangerous propellant material. The expelling force is furnished by the molded in elastic memory which continuously urges the container 10A toward a collapsed configuration.

FIGS. 7 through 14 illustrate the formation of a collapsed preform of a slightly different configuration from that illustrated in FIGS. 1 through 6 using a slightly different set of mechanisms. However, process steps and the basic theory involved in FIGS. 7 through 14 is identical to that previously described with respect to FIGS. 1 through 6. In FIG. 7, a preform 36 is shown after blowing from a tubular parison in a preform mold 38. The preform 36 is suspended from a first blow tube 40. As was the case in the previously described configuration, the preform 36 has been formed from a freely pendant extruded tube of a thermoplastic material. The tail portion 41 of the preform 36 is removed by a tail removal mechanism 42. A cutting sleeve 44 removes the excess material or flash 45 from the upper portion of the preform 36. The top view of FIG. 8 illustrates that the preform 36 shown in FIG. 7 is of a generally rectangular configuration having opposed sidewall pairs 46 and 47 and 48 and 49. Sidewalls 46 and 47 angle inwardly slightly to form a fold line 43 at their respective centers.

After blowing of the preform 36, the preform mold 38 is opened leaving the preform 36 suspended from the first blow tube 40. The preform 36 is then positioned between two-split sections 51 and 52 of a deformation mold 50 as seen in FIG. 9. The top view of FIG. 10 illustrates that the internal cavity of the deformation mold 50 has two projections 54 and 55 which are used in part to cause a folding or collapse of the preform 36 into a desired configuration for the finished container 36A.

FIG. 11 illustrates the deformation mold 50 in a completely closed position. Note that the sidewalls 46 and 47 have been collapsed onto one another as have the sidewalls 48 and 49. This is a configuration generally considered to be a gusseted configuration and the container 36A is now a basically flat shape. This is further illustrated in the top view of FIG. 12. Note again that the outside and inside walls of the preform 36 have been cooled sufficiently at this time that they will not stick together, but the interior of these walls is still sufficiently deformable or pliable that the folding action caused by the closing of the deformation mold 50 will cause the preform 36 to take a permanent set in the folded condition. Also in FIG. 11, the first blow tube 40 has been removed and a second blow tube 56 has been inserted. As was noted before, the use of a second blow tube 56 is optional. The deformation mold 50 is opened after a suitable length of time has passed, and the now folded container 36A is left suspended from the second blow tube 56 from which it may be ejected for further processing.

FIG. 13 illustrates that when the folded container 36A is filled with a fluid, it will expand to a size and shape nearly approximating that of the original preform 36 shown in FIGS. 7, 8, 9 and 10. However, as FIG. 14 illustrates, the folded container 36A will eventually revert to its folded configuration as the contents of the filled container 36A are emptied for use. This particular configuration could be useful for products such as toothpaste or shampoo which are typically packaged in tubular type plastic containers. In addition, this particular configuration could be useful for large, thin-walled containers. These containers could be shipped flat, thus reducing the volume required for both shipment and storage.

I claim:

1. In a method of making a container of thermoplastic material wherein a parison is enclosed in a preform blow mold having an interior cavity wherein at least some wall sections joining opposite wall sections have a pleated configuration, wherein a blow tube is inserted into said mold enclosed parison, and wherein said parison is blown to the shape of said preform mold cavity to thereby define a preform of a configuration in which at least some wall sections joining opposite wall sections have a pleated configuration, the improvement in said method which comprises the steps of:

cooling the interior and exterior surfaces of said pleated preform to a temperature at which these surfaces may be moved into contact with one another without sticking while maintaining the interior position between said surfaces at an elevated temperature readily susceptible to deformation sufficient for imparting a new memory to the deformed preform;

removing said preform from said preform blow mold;

transferring said preform to a deformation mold, said deformation mold including a movable bottom plate portion, said preform being positioned such that the bottom portion of said preform rests upon said movable bottom plate;

closing said deformation mold around said preform;

moving said bottom plate of said deformation mold upon which the lower portion of said preform rests toward said blow tube;

collapsing said preform by folding of said pleated preform along the roots and crests of said pleats as a result of the movement of said bottom plate, the degree of collapse being sufficient to bring at least portions of the exterior sidewalls into abutting contact and at least portions of the interior sidewalls into abutting contact; and cooling the collapsed preform in said deformation mold while held in said collapsing condition to allow said collapsed preform to set with memory in the collapsed state.

2. In a method of making a container of thermoplastic material wherein a parison is enclosed in a preform blow mold having an interior cavity wherein at least some wall sections joining opposite wall sections have a pleated configuration, wherein a blow tube is inserted into said mold enclosed parison, and wherein said parison is blown to the shape of said preform mold cavity to thereby define a preform of a configuration in which at least some wall sections adjoining opposite wall sections have a pleated configuration, the improvement in said method which comprises the steps of:

cooling the interior and exterior surfaces of said pleated preform to a temperature at which these surfaces may be moved into contact with one another without sticking while maintaining the interior portion between said surfaces at an elevated temperature readily susceptible to deformation sufficient for imparting a new memory to the deformed preform;

removing said preform from said preform blow mold;
transferring said preform to a deformation mold;
closing said deformation mold around said preform;
connecting said blow tube to a vacuum pump;
venting said deformation mold to the outside atmosphere;

collapsing said preform by folding of said pleated preform along the roots and crests of said pleats as a result of the pressure differential between the interior of said preform and atmospheric pressure, the degree of collapse being sufficient to bring at least portions of the exterior sidewalls into abutting contact and at least portions of the interior sidewalls into abutting contact; and cooling the collapsed preform in said deformation mold while being held in said collapsed condition to allow said collapsed preform to set with memory in the collapsed state.

3. In a method of making a container of thermoplastic material wherein a parison is enclosed in a preform blow mold having an interior cavity wherein at least some wall sections joining opposite wall sections have a pleated configuration, wherein a blow tube is inserted into said mold enclosed parison, and wherein said parison is blown to the shape of said preform mold cavity to thereby define a preform of a configuration in which at least some wall sections joining opposite wall sections have a pleated configuration, the improvement in said method which comprises the steps of:

cooling the interior and exterior surfaces of said pleated preform to a temperature at which these surfaces may be moved into contact with one another without sticking while maintaining the interior portion between said surfaces at an elevated temperature readily susceptible to deformation sufficient for imparting a new memory to the deformed preform;

removing said preform from said preform blow mold;

transferring said preform to a deformation mold;

closing said deformation mold around said preform;

venting said deformation mold to the outside atmosphere;

introducing a gas under pressure above atmospheric pressure into the bottom of said deformation mold;

collapsing said preform by folding of said pleated preform along the roots and crests of said pleats as a result of the pressure differential between the interior of said preform and said gas under pressure, the degree of collapse being sufficient to bring at least portions of the exterior sidewalls of said preform into abutting contact and at least portions of the interior sidewalls of said preform into abutting contact; and cooling the collapsed preform in said deformation mold while held in said collapsed condition to allow said collapsed preform to set with memory in the collapsed state.

4. In a method of making a container of thermoplastic material wherein a parison is enclosed in a preform blow mold having an interior cavity of a generally rectangular configuration wherein two opposed sidewalls thereof are inwardly inclined to define two fold lines, each of said opposed sidewalls thereby having two adjoining surfaces defined by the distance from the fold line to an adjacent corner, wherein a blow tube is inserted into said mold enclosed parison, and wherein said parison is blown to the shape of said preform mold cavity to thereby define a preform of a generally rectangular configuration in which two opposed sidewalls are inwardly inclined and have fold lines defined along their vertical height, the improvement in said method in which comprises the steps of:

cooling the interior and exterior surfaces of said rectangular preform to a temperature at which these surfaces may be moved into contact with one another without sticking while maintaining the interior portion between said surfaces at an elevated temperature readily susceptible to deformation sufficient for imparting a new memory to the deformed preform;

removing said preform from said preform blow mold;

transferring said preform to a deformation mold having an internal mold cavity volume smaller than the volume of said preform;

closing said deformation mold around said preform;

simultaneously with the closing of said deformation mold, collapsing said preform by folding along said fold lines as a result of the reduction of the volume available to said preform, the amount of collapse being sufficient to bring said adjoining surfaces of each of said two opposed sidewalls into abutting contact and to bring portions of the interior of said preform into contact with one another; and cooling the collapsed preform in said deformation mold while being held in said collapsed condition to allow said collapsed preform to set with memory in the collapsed state.

* * * * *